United States Patent Office 2,877,250
Patented Mar. 10, 1959

2,877,250

RECOVERY OF URANIUM VALUES

Keith B. Brown and David J. Crouse, Jr., Oak Ridge, and John G. Moore, Clinton, Tenn., assignors to the United States of America as represented by the United States Atomic Energy Commission No Drawing. Application December 10, 1956
Serial No. 627,515

17 Claims. (Cl. 260—429.1)

Our invention relates to a liquid-liquid extraction method for recovering uranium values from aqueous acidic solutions and more particularly to a method for extracting uranium values by the use of organo-nitrogen compounds as the extracting reagents.

There are several basic processes which have been used in the prior art for recovering uranium from aqueous solutions, including precipitation, ion-exchange resin sorption, and liquid-liquid extraction. There are particular advantages in the use of liquid-liquid extraction techniques; however, the range of applicability of the prior-art uranium extractants is limited. For example, tributylphosphate, which is used extensively in extraction of uranium from highly-salted nitrate solutions, is not effective in extracting uranium from the sulfate liquors derived from the leaching of ores with sulfuric acid. Sulfuric acid, because of its relatively low cost, is the usual acid of choice in the leaching of uranium ores. The following table gives examples of uranium extraction coefficients of tributylphosphate from sulfate solutions.

TABLE I

*Extraction of uranium (VI) from sulfate solutions with tributylphosphate*

[Initial uranium concentration, 1 g./liter]

| Tributylphosphate Concentration (in kerosene) | Aqueous Solution | Uranium Extraction Coefficient, $E_a^0(U)$ |
|---|---|---|
| 0.1 molar | 1.5 molar Sulfuric Acid | 0.00005 |
| 0.5 molar | do | 0.0002 |
| 0.08 molar | 0.5 molar Sulfate, pH 1 | 0.002 |
| Undiluted Tributylphosphate | do | 0.01 |

The uranium extraction coefficient, $E_a^0(U)$, is a measure of the extraction power for uranium, and is defined as the ratio of the concentration of uranium in the extractant to the concentration of uranium in the aqueous solution at equilibrium. In order to give an economical liquid-liquid extraction process, the extraction coefficient should at least approach unity for processing concentrated uranium solutions, and it should be at least one and preferably higher for processing dilute uranium solutions. The data in Table I show that the uranium extraction coefficients obtainable with the prior-art extractant tributylphosphate from dilute sulfate solutions are too low for desirably economical process.

One object of our invention is to provide an improved method for recovering uranium values from acidic aqueous solutions.

Another object of our invention is to provide an improved method for recovering uranium values from process liquors resulting from the leaching of uraniferous materials with aqueous solutions of sulfuric acid.

Another object of our invention is to provide water-immiscible liquid extractants which will have high extraction power for uranium values in the presence of high concentrations of sulfate, phosphate, and fluoride ions.

Still another object of our invention is to provide extractants which will have high selectivity for uranium values compared to contaminants commonly present in process liquors.

Still another object of our invention is to provide an economical method for recovering uranium values from process liquors of low uranium assay.

Still another object of our invention is to provide extractants from which the extracted uranium values can be removed by an efficient and economical stripping method.

Still another object of our invention is to provide extractants the extraction power of which will not be impaired by build-up of extracted contaminants.

Still another object of our invention is to provide extractants of sufficient chemical and physical stability to be used continuously in a cyclic process without excessive loss.

Other objects of our invention will become apparent from the following detailed description and the claims appended thereto.

In accordance with our invention uranium values may be recovered from an acidic aqueous solution by a process which comprises contacting said solution with a mixture of a substantially water-immiscible diluent and an organo-nitrogen compound of the class described below, whereby uranium values are extracted into the organic phase, separating the uranium-loaded organic phase from the remaining acidic solution, and recovering extracted uranium values from said uranium-loaded organic phase.

In using the process of our invention, the uranium-bearing acidic solution is preferably contacted with an organo-nitrogen compound dissolved in an immiscible organic diluent. We have found that amines represented by the formulas

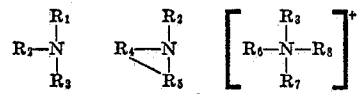

where $R_1$ and $R_2$ are selected from the group consisting of hydrogen, alkyl radicals, alkylene radicals, and alkyl and alkylene radicals having at least one substituent selected from the group consisting of aryl, hydroxyl, amino, and alkoxyl, $R_3$, $R_6$, $R_7$, and $R_8$ are selected from the group consisting of alkyl radicals, alkylene radicals and alkyl and alkylene radicals having at least one substituent selected from the group consisting of aryl, hydroxyl, amino and alkoxyl, and $R_4$–$R_5$ represents a polymethylene group, the total number of carbon atoms in said compound being at least ten, will extract uranium values from an acidic aqueous solution containing said values.

The term "polymethylene" is used herein and in the appended claims to mean polymethylene and substituted polymethylenes including oxa- and aza-substituted polymethylenes. We use the term amine to mean the organo-nitrogen compounds represented by the formulas given above.

The following table gives the uranium extraction coefficients of a number of typical amines which may be used in our process.

TABLE II

Extraction of Uranium (VI) with amines

[Sulfate concentration, 1 molar; initial uranium concentration, 1 g. per liter; amine concentration, 0.1 molar except as otherwise noted; pH 1]

PRIMARY AMINES

| Extraction Reagent | Uranium Extraction Coefficient, $E_a^0$ (U) Diluent | | |
|---|---|---|---|
| | Chloroform | Benzene | Kerosene |
| "Armeen 10D" (90 percent n-decylamine, 7 percent laurylamine, 3 percent n-octylamine) | 4 | | |
| "Armeen TD" (A mixture of amines comprised of hexadecylamine, octadecylamine, and octadecenylamine and derived from tallow fatty acids) | 2 | <0.1 | |
| 1-Isobutyl-3,5-dimethylhexylamine | 35 | 7 | |
| 3-Ethyl-1-isobutyloctylamine | 50 | 20 | |
| 1-Heptyloctylamine | 65 | 30 | (b) |
| 1-(3-Ethylpentyl)-4-ethyloctylamine | 65 | 30 | 25 |
| 1-Undecyldodecylamine | 100 | 45 | 30 |
| "Primene 81T" (trialkylmethylamine, 12 to 15 carbon atoms) | 60 | 4 | |
| "Primene JM" (trialkylmethylamine, 18 to 24 carbon atoms) | 90 | 10 | 3 |

SECONDARY AMINES

| Extraction Reagent | Chloroform | Benzene | Kerosene |
|---|---|---|---|
| Di-n-heptylamine | 100 | 4 | |
| Di-n-octylamine | 110 | 5 | |
| Di-n-decylamine | 150 | 90 | (b) |
| Dilaurylamine | 100 | 80 | (b) |
| Di-n-tetradecylamine, 0.05 molar | 15 | 20 | (b) |
| Di-n-hexadecylamine, 0.05 molar | 30 | 20 | (b) |
| Di-n-octadecylamine, 0.01 molar | 0.1 | 0.2 | <0.1 |
| "Armeen 2-12" ($R_2$ and $R_3$ containing 8-18 carbon atoms and are principally lauryl derived from coconut oil) | 300 | 100 | |
| "Armeen 2C" ($R_2$ and $R_3$ containing 8-18 carbon atoms and are principally lauryl, derived from coconut oil) | 200 | 160 | |
| "Armeen 2S" ($R_2$ and $R_3$ principally hexadecyl, octadecyl, octadecenyl, and octadecadienyl, derived from soy bean oil) | 50 | 100 | 30 |
| "Armeen 2T" ($R_2$ and $R_3$=principally hexadecyl, octadecyl, and octadecenyl derived from tallow fatty acids) | 150 | 125 | 30 |
| "Armeen 2HT" ($R_2$ and $R_3$=principally hexadecyl and octadecyl derived from hydrogenated tallow) 0.05 molar | 12 | | |
| Dibenzylamine | 3 | | |
| Di-α-methylbenzylamine | .7 | 0.02 | <0.02 |
| Di-2-ethylhexylamine | 25 | 100 | |
| Bis-(2-methylcyclohexylmethyl) amine | 25 | 40 | |
| Bis-(di-isobutylmethyl) amine, 0.19 molar | 10 | 75 | |
| Di-"oxo" decylamine (branched primary alkyls) | 25 | 20 | (b) |
| Bis-(1-methyl-4-ethyloctyl) amine | 12 | 25 | 8 |
| Di-2-butyloctylamine | 6 | 130 | 450 |
| "Amine S-24" (Bis-(1-isobutyl-3,5-dimethylhexyl) amine) | 1.3 | 20 | 110 |
| Di-tridecyl-"B"-amine (branched primary alkyls) | 6 | 4 | (b) |
| Di-tridecyl-"P"-amine (branched primary alkyls) | 40 | 120 | 85 |
| N-Methyllaurylamine | 6 | <0.1 | <0.1 |
| N-(2-ethylhexyl)-1-isobutyl-3,5-dimethylhexylamine | 3 | 75 | 190 |
| N-(2-ethylhexyl)-2-pentylnonylamine | 1.3 | 10 | 14 |
| N-(1-isobutyl-4-ethyloctyl)-n-decylamine | 25 | 100 | 130 |
| "R & H 9D-178" (N-dodecenyltrialkylmethylamine, 24 to 27 carbon atoms) | 7 | 70 | 90 |
| "R & H FO-317" (N-dodecenyltrialkylmethylamine, 30 to 36 carbon atoms) | 10 | 65 | 75 |
| N-Benzylaurylamine | 340 | 130 | (b) |
| N-Benzyl-n-tetradecylamine | 250 | 400 | (b) |
| N-Benzyl-1-isobutyl-4-ethyloctyl-amine | 350 | >1,000 | >1,000 |
| N-Benzyl-1-(3-ethylpentyl)-4-ethyloctylamine | 110 | >1,000 | >1,000 |
| N-α-Methylbenzyl-2-ethylhexylamine | 180 | 65 | |
| N-α-Xylybenzyl-2-ethylhexylamine, 0.15 molar | 1.3 | 6 | |
| N-3-Phenylpropyl-n-tetradecylamine | 250 | 75 | (b) |
| N-(2-Naphthyl) methyl-1-isobutyl-3,5-dimethylhexylamine | 125 | >1,000 | 550 |
| N-β-(di-n-heptylmethyl) aminoethyl-(di-n-heptyl)methylamine (i.e., N,N'-bis(1-heptyloctyl)-ethylenediamine) | 1.8 | ppt. | |
| "Duomeen S" (N-γ-propylaminoalkylamine, the alkyl=principally hexadecyl, octadecyl, octadecenyl, and octodecadienyl and is derived from soy bean oil) | 1 | ppt. | |

See footnote at end of table.

TABLE II—Continued

HETEROCYCLIC SECONDARY AMINES

| Extraction Reagent | Uranium Extraction Coefficient, $E_a^0$ (U) Diluent | | |
|---|---|---|---|
| | Chloroform | Benzene | Kerosene |
| n-Heptadecylglyoxalidine | 2 | Insol. | |

TERTIARY AMINES

| Extraction Reagent | Chloroform | Benzene | Kerosene |
|---|---|---|---|
| Tri-n-butylamine | 1.1 | >0.1 | |
| Tri-n-hexylamine | 3 | <100 | |
| Tri-n-octylamine | 3 | 110 | a 130 |
| Tri-n-decylamine | 6 | 50 | 25 |
| Tri-laurylamine | 4 | 140 | 70 |
| Tri-iso-octylamine | 0.6 | 100 | a 100 |
| Tris-(tridecyl "B")-amine (branched primary alkyls) | 0.1 | 1 | 7 |
| N-Methyldi-n-octylamine | 30 | 30 | |
| N-Methyldi-n-decylamine | 45 | 45 | (b) |
| N-Methyldilaurylamine | 40 | 70 | |
| N-Methyldi-n-octadecylamine, 0.01 molar | >0.1 | 1.1 | |
| N-Methyl-di-2-ethylhexylamine | 8 | 3 | |
| "Armeen M2C" ($R_1$=methyl, $R_2$ and $R_3$=principally lauryl, derived from coconut oil) | 6 | 40 | |
| "Armeen M2HT" ($R_1$=methyl, $R_2$ and $R_3$=principally hexadecyl and octadecyl, derived from hydrogenated tallow) | 40 | 60 | |
| "Armeen M2S" ($R_1$=methyl, $R_2$ and $R_3$=principally, hexadecyl, octadecyl, octadecenyl, and octadecadienyl, derived from soy bean oil) | 55 | 75 | |
| N-Lauryldimethylamine | 7 | >0.1 | >0.1 |
| N-Lauryldiethylamine | 20 | >0.1 | |
| N-Lauryldi-n-butylamine | 10 | 95 | (b) |
| N-Lauryldi-n-hexylamine | 6 | 110 | (b) |
| N-Lauryldibenzylamine | 1.7 | 1.5 | 0.3 |
| N-Benzyldilaurylamine | 4 | 50 | 15 |
| N-Propyldi-n-decylamine | 150 | 80 | (b) |
| N-Butyldi-3,5,5-trimethylhexylamine | 3 | 85 | a 60 |
| N-(Tridecyl "B")-di-n-hexylamine (branched primary alkyl) | 1.5 | 70 | a 65 |
| N-Butyldidodecenylamine | 3 | 135 | |
| N-β-Hydroxyethyldilaurylamine | 2 | 5 | 1.7 |
| N-β-Hydroxyethyldi-2-ethylhexylamine | 2 | 1.5 | (b) |
| "Ethomeen S—15" (N-alkyl-bis-(hydroxy-polyethoxyethyl) amine; reaction product of one mole, Armeen SD c with 5 moles ethylene oxide) | 1 | >0.1 | >0.1 |
| "Ethomeen S—60" (N-alkyl-bis-(hydroxypolyethoxyethyl) amine; reaction product of one mole of Armeen SD c with 50 moles of ethylene oxide) | 4 | >0.1 | Insol. |

HETEROCYCLIC TERTIARY AMINES

| Extraction Reagent | Chloroform | Benzene | Kerosene |
|---|---|---|---|
| N-n-Decylpiperidine | 50 | >0.1 | >0.1 |
| N-"Coco"-morpholine (principally N-laurylmorpholine, derived from coconut oil) | 55 | >0.1 | >0.1 |
| N-"Tallow"-morpholine (alkyl=principally hexadecyl, octadecyl, and octadecenyl, derived from tallow) | 35 | 20 | >0.1 |
| 1-β-Hydroxyethyl-2-heptadecenylglyoxalidine | 1 | >0.1 | |

QUATERNARY AMMONIUM COMPOUNDS

| Extraction Reagent | Chloroform | Benzene | Kerosene |
|---|---|---|---|
| "Arquad 2C" (Dialkyldimethylammonium chloride, alkyls principally lauryl, derived from coconut oil) | 1 | >0.1 | |
| "Roccal" (Alkyldimethylbenzylammonium chloride, 17—27 carbon atoms) | 5 | (b) | |
| Cetyldimethylbenzylammonium chloride | 2 | 1 | |
| "Hyamine 10X" (Benzyldimethyl (1,1,3,3-tetramethylbutyltoloxyethoxy) ethylammonium chloride) | 8 | | | a Kerosene diluent modified by addition of 2 volume percent capryl alcohol.
b Third liquid phase formed.
c Armeen SD is a mixture of primary amines having alkyls derived from soybean oil and containing from 16 to 18 carbon atoms.

As may be seen from the data in Table II amines of the class described above will extract uranium values from an aqueous acidic solution containing sulfate ions. The following table gives the uranium extraction coefficients for typical amines from aqueous acidic solutions containing ions selected from phosphate, sulfate, nitrate, fluoride, chloride, and acetate ions.

TABLE III

*Extraction of uranium (VI) from aqueous acidic solutions with amines*

[Initial uranium concentration, 1 g./liter; amine concentration, 0.1 molar]

PHOSPHORIC ACID

| Amine | Initial Anion Concentration, molarity | pH Initial | pH Final | Uranium Extraction Coefficient, $E_a^0$ (U) |
|---|---|---|---|---|
| Methyldi-n-decylamine in benzene | 0.7 | ---- | 1.0 | 15 |
|  | 1.3 | 0.6 | 0.7 | 2 |

SULFURIC ACID

| Amine | Initial Anion Concentration, molarity | pH Initial | pH Final | Uranium Extraction Coefficient, $E_a^0$ (U) |
|---|---|---|---|---|
| Methyldi-n-decylamine in Amsco D-95 a | 0.5 | 0.4 | 0.4 | 10 |
|  | 0.1 | 1.0 | 1.2 | 800 |
| Tri-n-octyl in Amsco D-95 a | 0.5 | 0.4 | 0.5 | 40 |
|  | 1.0 | 0.2 | 0.2 | 8 |
|  | 2.0 | ~0 | ~0 | 1 |

SULFATE

| Amine | Initial Anion Concentration, molarity | pH Initial | pH Final | Uranium Extraction Coefficient, $E_a^0$ (U) |
|---|---|---|---|---|
| Methyldi-n-decylamine in Amsco D-95 a | 0.5 | 1.0 | 1.1 | 40 |
| Tri-n-octylamine in Amsco D-95 a | 0.5 | 1.1 | 1.2 | 160 |
|  | 1.0 | 1.0 | 1.1 | 60 |
|  | 2.0 | 1.0 | 1.0 | 10 |

NITRIC ACID

| Amine | Initial Anion Concentration, molarity | pH Initial | pH Final | Uranium Extraction Coefficient, $E_a^0$ (U) |
|---|---|---|---|---|
| Methyldi-n-decylamine in benzene | 0.1 | 1.0 | 2.6 | >0.01 |
|  | 1.0 | ~0 | ~0 | 0.03 |
|  | 4.6 | ---- | ---- | 0.26 |

NITRATE

| Amine | Initial Anion Concentration, molarity | pH Initial | pH Final | Uranium Extraction Coefficient, $E_a^0$ (U) |
|---|---|---|---|---|
| Tri-n-octylamine in Amsco D-95 a | 1.0 | 0.1 | 0.1 | 0.03 |
|  | 4.5 | 0.1 | 0.1 | 1.5 |
|  | 5.5 | 0.1 | 0.1 | 3 |
|  | 1.1 | 0.9 | 0.9 | 0.06 |
|  | 4.0 | 0.9 | 1.0 | 1.5 |
|  | 6.0 | 0.9 | 0.9 | 7 |

HYDROCHLORIC ACID

| Amine | Initial Anion Concentration, molarity | pH Initial | pH Final | Uranium Extraction Coefficient, $E_a^0$ (U) |
|---|---|---|---|---|
| Methyldi-n-decylamine in benzene | 0.1 | 1.0 | 1.6 | <0.01 |
|  | 1.4 | ~0 | ~0 | 0.2 |
|  | 3.8 | ---- | ---- | 7 |
|  | 6.0 | ---- | ---- | 90 |
|  | 8.8 | ---- | ---- | 500 |

TABLE III—Continued

FLUORIDE

| Amine | Initial Anion Concentration, molarity | pH Initial | pH Final | Uranium Extraction Coefficient, $E_a^0$ (U) |
|---|---|---|---|---|
| Tri-n-octylamine in Amsco D-95 a | 0.5 | 1.3 | 1.4 | 140 |
|  | 1.0 | 1.0 | 1.2 | 35 |
|  | 2.0 | 1.0 | 1.1 | 5 |
|  | 3.0 | 1.0 | 1.1 | 1.6 |

ACETIC ACID

| Amine | Initial Anion Concentration, molarity | pH Initial | pH Final | Uranium Extraction Coefficient, $E_a^0$ (U) |
|---|---|---|---|---|
| Methyldi-n-decylamine in benzene | 0.1 | 3.3 | 3.7 | 1.3 |
|  | 0.5 | 2.7 | 3.0 | 6 |
|  | 1.0 | 2.4 | 2.7 | 5 | a Amsco D-95 is an aromatic petroleum fraction further identified in Table V.

As may be seen from the data in Table III, usefully high uranium extraction powder is available with amines from solutions of each of these acids under appropriate conditions, namely, low to moderate concentrations of sulfate, phosphate, fluoride, and acetate, high concentrations of chloride, and high concentrations of nitrate at moderate pH.

We have found that uranium can be extracted effectively from aqueous acidic solutions when either in the VI oxidation state, i. e., uranyl ion, $UO_2^{++}$, or in the IV oxidation state, i. e., uranous ion. The extraction of uranium (VI) is shown in Tables II, and III, and the following table gives some examples of the corresponding extraction of uranium (IV) from aqueous acidic solutions with typical amines.

TABLE IV

*Extraction of uranium (IV) from sulfate solution*

| Amine (0.1 Molar) | Diluent | Initial Sulfate Conc., Molar | Initial pH | Uranium Extraction Coefficient $E_a^0$ (U) |
|---|---|---|---|---|
| 1-(3-Ethylpentyl)-4-ethyloctylamine | Amsco D-95 a | 1.0 | 0.4 | 1,100 |
|  |  |  | 1.0 | 3,000 |
|  |  |  | 1.7 | 1,300 |
| "Primene JMT" (trailkylmethylamine, 18-24 carbon atoms) | Kerosene | 0.5 | 1.0 | >1,000 |
|  |  |  | 1.6 | >1,000 |
| "Armeen 2-12" (see Table II for identification) | Kerosene +5% Tridecyl alcohol | 0.5 | 1.0 | 220 |
|  |  |  | 1.6 | 310 |
| Dilaurylamine | Amsco D-95 a | 1.0 | 0.4 | 20 |
|  |  |  | 1.0 | 180 |
|  |  |  | 1.7 | 120 |
| "R & H 9D-178" (N-dodecenyl-trialkylmethyl-amine, 24-27 carbon atoms) | Kerosene | 0.5 | 1.0 | 80 |
|  |  |  | 1.6 | 480 |
| Bis(1-isobutyl-3,5-dimethylhexyl) amine | ...do... | 0.5 | 1.0 | 45 |
|  |  |  | 1.6 | 490 |
| Bis(di-isobutylmethyl) amine | Amsco D-95 a | 1.0 | 0.4 | 1 |
|  |  |  | 1.0 | 6 |
| Tri-n-decylamine | ...do a... | 1.0 | 0.4 | 2 |
|  |  |  | 1.0 | 5 |
| Tri-n-octylamine | Kerosene +2% Tridecyl alcohol | 0.5 | 1.7 | 12 |
|  |  |  | 1.0 | 1 |
|  |  |  | 1.6 | 2 | a Amsco D-95 is more specifically identified in Table V.

While any of the amines of the type illustrated in Tables II, III, and IV are suitable extractants for uranium, we have found that the secondary and tertiary amines, and especially tertiary and branched chain secondary amines are exceptionally good uranium extractants and are preferred.

While we have found undiluted liquid amines will extract uranium from aqueous acidic solutions, the extractants became very viscous and difficult to handle, and we prefer to dissolve the extraction reagent in a diluent, which should have the following characteristics: (1) substantial immiscibility with the aqueous solution; (2) ability to dissolve the extraction reagent, its salts with anions encountered in extraction and stripping, and the extracted uranium complex; (3) freedom from interfering interaction with the extraction reagent; and (4) suitable density and viscosity for ready separation from the aqueous phase.

We have found aliphatic hydrocarbons, aromatic solvents, aromatic petroleum fractions, ketones, nitrohydrocarbons, and chlorinated solvents to be suitable diluents. The aromatic petroleum fractions as illustrated by "Amsco G," "Amsco D-95," "Solvesso 100," and "Solvesso 150" are ordinarily preferred because of their higher flash point, lower vapor pressure, and lower toxicity. The following table gives physical data which more specifically identifies these aromatics.

TABLE V

Physical properties of several aromatic hydrocarbon diluents

| Physical Property | Diluent | | | |
|---|---|---|---|---|
| | Amsco D–95 a | Amsco G a | Solvesso 100 | Solvesso 150 |
| Sp. Gr., 60/60° F | 0.8756 | 0.8866 | 0.8721 | 0.8964 |
| API Gr. @ 60° F | 30.1 | 28.1 | 30.7 | 26.3 |
| Distillation, ° F., ASTM: | | | | |
| Initial Boiling Point | 284 | 364 | 318 | 365 |
| 5% | | | 321 | 370 |
| 50% | 310 | 373 | 325 | 379 |
| 90% | | | 329 | 390 |
| 95% | | | 331 | 397 |
| Dry end Point | 390 | 400 | 355 | 425 |
| Final end Point | 395 | 404 | | |
| Flash Point, ° F. (Tag closed cup) | 92 | 150 | 115 | 152 |
| Kauri-Butanol Value | 973 | 87.0 | 89.5 | 88.3 |
| Viscosity, cs. 25° C | | | 0.908 | 1.376 |
| Surface Tension (dynes/cm.) @ 25° C | | | 31.0 | 32.3 | a An aromatic petroleum fraction from hydroforming process.

Benzene, toluene and xylene are typical of aromatic solvents which are suitable diluents.

Kerosene is typical of the aliphatic hydrocarbon diluents. We have found that kerosene is a suitable diluent for most of the long branched chain secondary amines, as illustrated by N-benzyl-1-(3-ethylpentyl)-4-ethyloctylamine, di-tridecyl "P"-amine, di-2-butyloctylamine, "Amine S-24" (identified in Table II), and "R & H 9D-178" (identified in Table II).

Kerosene is a suitable diluent under a wide range of process conditions for symmetrical tertiary amines of sufficient chain length as illustrated by tri-n-decylamine and trilaurylamine. We have found that the addition of a long chain alcohol to the kerosene diluent improves the selectivity of the extractant for uranium, and sometimes improves the rate of phase separation. Addition of too much alcohol severely impairs the uranium extraction power, but addition of not more than 10 volume percent ordinarily causes only a small decrease in uranium extraction power, and may even increase the uranium extraction by the less-selective amines from contaminated liquors by virtue of the improved selectivity.

Kerosene modified with a long chain alcohol is a suitable diluent for symmetrical tertiary amines of shorter chain length as illustrated by tri-n-octylamine and tri-isooctylamine. Under the most favorable conditions unmodified kerosene may be a suitable diluent for these amines.

Under favorable conditions, including the conditions usually encountered in processing uranium ore sulfate leach liquors, kerosene modified with a long chain alcohol is a suitable diluent for even the straight chain secondary amines and the N-methyl-straight chain tertiary amines as illustrated by di-n-decylamine, dilaurylamine, "Armeen 2-12" (identified in Table II) and N-methyl-di-n-decylamine.

We have found that the concentration of the amine in the extractant is not critical. We have found that when the excess of amine was sufficient to avoid saturation effects, the uranium extraction coefficient was approximately proportional to the amine concentration in the extractant. We have also found that the maximum concentration of uranium that can be taken into the extractant is approximately proportional to the amine concentration. For example, when an amine is used at a concentration of 0.1 molar, uranium concentrations in the order of 4 to 6 g. uranium per liter of extractant can be readily achieved under conditions typical of process applications. We have found amine concentration of from approximately 0.01 to over 0.2 molar to be suitable, and a concentration of from approximately 0.05 molar to approximately 0.2 molar is preferred.

We measured the effect of temperature in the range of 20° C. to 50° C. on the uranium extraction coefficients of several amines. The extraction coefficients decreased with increasing temperature. However, even at 50° C. the extraction coefficients of the amines tested at 0.1 molar were sufficiently high for use in a practicable liquid-liquid extraction process. The temperature at which the extraction is carried out is not critical, at least up to 50° C. We prefer a temperature range between 20° C. and 35° C.

In view of the extended use of sulfuric acid in uranium ore processing and the exceptionally high uranium extraction coefficients of the amines in the presence of the sulfate ion, our process is exceptionally useful in recovering uranium values from aqueous acidic sulfate solutions.

We have found that the extraction of uranium from acidic sulfate solutions is sensitive to both the sulfate concentration and the pH of the aqueous phase. The effects of those variables for several amines are illustrated by the data given in the following table.

TABLE VI

Effect of sulfate concentration and pH on uranium extraction by amines

[Initial uranium concentration, 1 g. per liter; amine concentration 0.1 molar in Amsco D-95a]

| | Init. SO$_4$ Concn., molar | pH | | Uranium Extraction Coeff., E$_a^0$ (U) |
|---|---|---|---|---|
| | | Initial | Final | |
| Di-n-decylamine | 0.1 | 1.0 | 1.1 | 425 |
| | | 1.5 | 2.0 | 770 |
| | | 2.0 | 2.6 | 830 |
| | 0.2 | 0.8 | ------ | 120 |
| | | 1.5 | 1.7 | 390 |
| | | 2.0 | 3.0 | 570 |
| | 0.5 | 0.4 | ------ | Emul. |
| | | 1.1 | 1.2 | 70 |
| | | 1.9 | 2.3 | 220 |
| | 1.0 | 0.2 | ------ | Emul. |
| | | 1.1 | ------ | 20 |
| | | 2.0 | 2.1 | 75 |
| | 1.5 | 0.05 | ------ | Emul. |
| | | 1.0 | 1.1 | 8 |
| | | 2.1 | 2.2 | 40 |
| | 2.0 | <0 | ------ | Emul. |
| | | 1.0 | 1.0 | 5 |
| | | 2.0 | ------ | 25 |
| Dilaurylamine | 0.1 | 1.0 | 1.1 | 370 |
| | | 1.5 | 1.9 | 650 |
| | | 2.0 | ------ | 630 |
| | 0.2 | 0.8 | 0.8 | 90 |
| | | 1.5 | 1.8 | 350 |
| | | 2.0 | 2.6 | 460 |
| | 0.5 | 0.4 | 0.5 | 20 |
| | | 1.1 | 1.2 | 60 |
| | | 1.9 | 2.3 | 170 |
| | 1.0 | 0.2 | ------ | Emul. |
| | | 1.1 | 1.2 | 15 |
| | | 2.0 | 2.1 | 60 |
| | 1.5 | 0.05 | ------ | Emul. |
| | | 1.0 | 1.2 | 8 |
| | | 2.1 | 2.2 | 30 |
| | 2.0 | <0 | ------ | Emul. |
| | | 1.0 | 1.1 | 4 |
| | | 2.0 | 2.1 | 20 |
| Methyldi-n-decylamine | 0.5 | 0.4 | 0.4 | 10 |
| | | 1.0 | 1.1 | 40 |
| | | 1.8 | 2.0 | 120 |
| | | 0.4 | 0.5 | 7 |
| | 1.0 | 1.0 | 1.1 | 20 |
| | | 1.8 | 2.0 | 50 |

TABLE VI—Continued

| | Init. SO₄ Concn., molar | pH | | Uranium Extraction Coeff., $E_a^o$ (U) |
|---|---|---|---|---|
| | | Initial | Final | |
| Tri-n-octylamine | 0.1 | 1.0 | 1.2 | 800 |
| | | 1.5 | 1.7 | 1,100 |
| | | 2.0 | 2.5 | 60 |
| | 0.2 | 0.8 | 0.8 | 300 |
| | | 1.5 | 1.7 | 750 |
| | | 2.0 | 2.2 | 290 |
| | 0.5 | 0.4 | 0.5 | 40 |
| | | 1.1 | 1.2 | 160 |
| | | 1.9 | 2.1 | 210 |
| | 1.0 | 0.2 | 0.2 | 8 |
| | | 1.0 | 1.1 | 60 |
| | | 1.9 | 2.0 | 110 |
| | 1.5 | 0.05 | 0.2 | 2 |
| | | 1.0 | 1.1 | 30 |
| | | 2.1 | 2.2 | 50 |
| | 2.0 | 0 | --- | 1 |
| | | 1.0 | 1.0 | 10 |
| | | 2.0 | 2.1 | 40 |

ᵃ Amsco D-95 is identified in Table V.

As is shown by the data in Table VI, the uranium extraction coefficients are higher at the lower sulfate concentrations and at the higher pH, at least up to pH 1.5, and usually up to pH 2. Although the lowest sulfate concentration shown in Table III is 0.1 molar, we have found that still lower sulfate concentrations are also favorable for uranium extraction, including a lowest concentrations consistent with a stable uranyl solution. The preferred sulfate concentration is less than one molar.

In extracting uranium from aqueous acidic solutions we have found that the extraction step will work well over an initial pH range from approximately zero to approximately 3 and an initial pH range of from approximately 0.9 to approximately 1.5 is preferred. If the pH is lower than desired, it may in some cases be raised by the addition of a basic reagent such as ammonium hydroxide, sodium carbonate, or calcium hydroxide or carbonate.

After the extraction step, the uranium-loaded extractant is transferred to a stripping section and is contacted with an aqueous phase containing a stripping agent. The choice to be made from several suitable stripping methods may be arbitrary, or in some particular applications it may be indicated by particular process conditions or objectives.

We have found that the uranium values may be precipitated directly from the organic solution with an aqueous solution of hydroxyl ion or an aqueous slurry of magnesium oxide or magnesium hydroxide, or can be removed from the organic solution in soluble form with aqueous solutions of a variety of reagents including the carbonate ion, the chloride ion, and the nitrate ion. Where the uranium is stripped in soluble form, precipitation of uranium from the strip solution is accomplished by methods commonly used in the uranium industry.

The following equations illustrate the reactions which may take place during the stripping cycle. These equations are written, for convenience, in terms of a tertiary amine, and in terms of $(R_3NH)_2UO_2(SO_4)_2$, which is one of the possible extracted uranium forms.

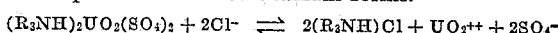
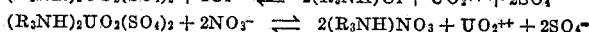
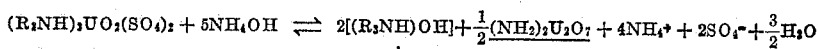
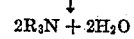
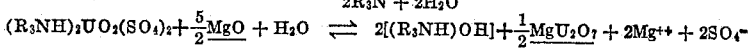
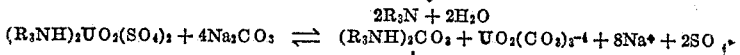
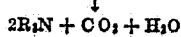

In these reactions it is immaterial whether the indicated amine hydroxide and amine carbonate actually exist or not, and whether the solid magnesium oxide reacts as such or first reacts with water to form solid magnesium hydroxide.

We have also found that the extracted uranium can be stripped by contacting the organic phase with a high concentration of nitrate ions, chloride ions, or hydrochloric acid, separating the two phases and then contacting the organic phase with water. The reactions resemble the following:

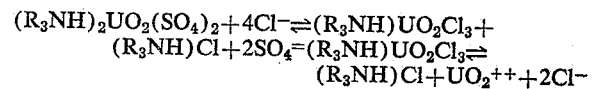

By the use of this method ions extracted with the uranium are removed from the organic phase in the step in which the chloride or nitrate ions are added.

In the use of each of these stripping reactions, it is preferred that some excess of the stripping agent is provided over the stoichiometric amounts required by the reactions shown plus the amounts required by the analogous reactions with any other extracted materials and with uncomplexed amine sulfate and bisulfate. The concentrations at which these stripping agents are used are not critical. When chloride is used according to the first equation its concentration in the stripping solution should not exceed 2 molar; concentrations between 1.5 molar and 0.5 molar are preferred. When chloride is used according to the last equation, its concentration in the stripping solution for the first step should not be less than 4 molar with 4 molar to 8 molar preferred, and a sufficient volume of water should be used in the second step so that the chloride concentration does not build up higher than 2 molar.

If either dilute chloride ion or dilute nitrate ion is used as the stripping agent, it can be furnished as a salt, e. g., NaCl or $NH_4NO_3$. Any acid required in the stripping solution can be furnished as HCl, $HNO_3$, or $H_2SO_4$. We have found 1 molar NaCl solution made 0.05 molar in $H_2SO_4$ and 1 molar $NH_4NO_3$ solution made 0.1 molar in $HNO_3$ to be suitable stripping solutions. Uranium enters the aqueous stripping solution as the uranyl ion at a relatively high concentration, and can be recovered in product form by methods well known to the art. The extractant leaves the stripping step with the amine in the form of its chloride or nitrate salt. It can be recycled as such to the extraction step, but we prefer, especially when nitrate is used, to remove the anion by contacting the organic phase with a basic reagent such as ammonium hydroxide, calcium hydroxide, or sodium carbonate, and to recycle the extractant with the amine in the free base form. With chloride, a suitable method is to use a low cost base, e. g., calcium hydroxide, and to discard the resulting chloride salt. With nitrate a suitable method is to select a base such that the resulting salt, e. g., $NH_4NO_3$, can be recycled to the stripping step.

If the hydroxide ion is used as the stripping agent, the uranium is precipitated as the diuranate. When sodium hydroxide or ammonium hydroxide is used to furnish the hydroxide ion, the diuranate formed is generally of a physical nature that makes it difficult to separate from both the organic and the aqueous phase. We have found unexpectedly good results may be obtained by the use of an aqueous slurry of magnesium hydroxide, or of magnesium oxide which is in effect equivalent to magnesium hydroxide, because the resulting diuranate precipitate does not collect in the organic phase, and is readily recovered from the aqueous phase. A stripping aqueous slurry containing preferably not more than approximately three percent by weight of magnesium oxide is suitable. It is preferred that the slurry be contacted with the extractant in such a manner that the organic phase is maintained continuous.

If carbonate ion is used as the stripping agent it can be furnished as sodium carbonate. A wide range of concentrations can be used, e. g., from 0.2 molar to 1.5 molar sodium carbonate but we prefer to use concentrations between 0.5 molar and 1.0 molar. The use of higher concentrations may incur some disadvantage by limiting the stable solubility of sodium uranyl tricarbonate. Uranium enters the aqueous stripping solution as the uranyl tricarbonate ion, and can be recovered in product form by methods well known to the art.

When uranium stirpping is accomplished by means of a base (carbonate, hydroxide, or basic oxide) all other extracted materials and all anions are also stripped out of the extractant, so that no trouble is encountered from build-up in the extractant of extracted contaminants. When uranium stripping is accomplished by means of chloride or nitrate ion, it is possible that some extracted contaminants may not be stripped and hence may tend to build up in the extractant and impair its uranium extraction power and capacity. However, any trouble from such a build-up can easily be avoided by regenerating the amine extraction reagent by contacting the stripped extractant with a basic reagent, which will strip out all the chloride or nitrate ion, and also all other extracted substances. Even in the absence of any trouble from build-up of extracted contaminants, it may be desirable after chloride stripping, and generally will be desirable after nitrate stripping, to regenerate the amine extraction reagent by means of a basic reagent. This is so because chloride ion and especially nitrate ion interfere with uranium extraction, for the same reason that they are effective in uranium stripping.

Contacting the aqueous and organic phases in the extraction step and in the stripping step may be accomplished in mixer-settlers, pulse columns, or any other suitable liquid-liquid contactor. The contact may be made in a countercurrent or cocurrent fashion.

The extractant and stripping reagents may be recycled, or may be discarded after one use.

Having thus described our invention, the following examples are offered to illustrate our invention in greater detail:

EXAMPLE I 24,000 lbs. of ore containing 72 lbs. of $U_3O_8$ are leached for four hours with 1800 lbs. $H_2SO_4$ diluted to 3000 gallons. The insoluble ore solids are separated from the liquor and washed with water in a countercurrent decantation circuit. The leached and washed ore solids are discarded. The clarified leach liquor produced, totaling 6000 gallons in volume has an analysis of 1.37 g. U, 5 g. Fe, 4 g. Al, 1 g. V, and 50 g. $SO_4$ per liter plus small concentrations of numerous other anions and cations. The pH is 0.8. This liquor which contains a total of 68.5 lbs. of $U_3O_8$ is transferred to the extraction section where it is passed through four mixer-settler units countercurrent to a stream of 0.1 molar bis(1-isobutyl-3,5-dimethylhexyl) amine in kerosene. The total organic phase flow is 1750 gallons. The uranium values transferred from the aqueous to the organic phase are equivalent to 68.4 lbs. of $U_3O_8$.

The uranium-bearing organic phase is passed to the stripping section where it is contacted countercurrently in four mixer-settler stages with 270 gallons of 1.0 molar NaCl-0.05 molar $H_2SO_4$ solution. The uranium values transfer to the aqueous phase and this loaded strip solution is pumped to the precipitation unit where anhydrous ammonia is added to pH 7. Uranium precipitates as the sodium and ammonium diuranates. The precipitate is filtered, washed, and dried to give the uranium product which assays 80% $U_3O_8$ and contains 68.3 lbs. of $U_3O_8$. The uranium-barren organic phase leaving the stripping section is pumped to the extraction section for reuse. Chemical reagent consumption for the extraction, stripping, and uranium precipitation operations totals 1.9 lbs. of NaCl, 0.16 lb. of $H_2SO_4$, 0.25 lb. of $NH_3$, 0.02 lb. of amine, and 0.05 gal. of kerosene per lb. of $U_3O_8$ recovered.

EXAMPLE II

As an alternate process, the clarified leach liquor (6000 gallons volume) liquor, produced as described in Example I, is fed to the extraction system where it is contacted countercurrently in three mixer-settler stages with an organic phase consisting of 0.1 molar tri(iso-octyl) amine dissolved in 97% kerosene-3% tridecyl alcohol diluent. The total organic phase flow is 1450 gallons. The uranium values transferred from the aqueous to the organic phases are equivalent to 68.4 lbs. $U_3O_8$. The aqueous phase is discarded. The uranium bearing organic phase is passed to the stripping section where it is contacted countercurrently in two mixer-settler stages with 235 gallons of 0.75 molar $Na_2CO_3$ solution. The uranium-barren organic phase leaving the stripping section is recycled to the extraction section. The loaded strip solution containing the uranium values passes to the precipitation unit. Dilute sulfuric acid is added to the strip solution to pH 1.5 and the solution is boiled to expel carbon dioxide. The uranium is precipitated as the sodium and ammonium diuranates by addition of anhydrous ammonia to pH 7. The precipitate is filtered, washed, and dried to give the uranium product, which assays 82% $U_3O_8$ and contains a total of 68.3 lbs. of $U_3O_8$. Chemical reagent consumption for the extraction, stripping, and precipitation operations totals 2.3 lbs. of amine, 0.01 lb. of tridecyl alcohol, and 0.04 gallon of kerosene per lb. of $U_3O_8$ recovered.

We have further found that uranium may be separated from contaminating metal ions present with the uranium in the aqueous acidic solution. The following table gives the extraction coefficients of amines for metal values which may be present with uranium values.

As may be seen from the data in Table VII the extraction power for Mg, Ca, Al, Cr(III), Mn(II), Co(II), Ni(II), Cu(II), Zn, Fe(II), and V(IV) values by any of the amines is very low from the sulfate solution, so that highly selective extraction of either uranium (VI) (Table II) or uranium (IV) (Table IV) will be attained in the presence of any of these metal values. The data in Table VII also show that although Fe(III), Ti, Zr, Ce(IV), and rare earths as represented by Y can be easily extracted from the sulfate solution by a primary amine, and some of them by a secondary amine, the use of a tertiary amine will permit the highly selective extraction of at least uranium (VI) in the presence of any of these values except Zr and Mo. When either Zr or Mo is encountered at significant concentrations in a process liquor, it may be necessary to free the uranium from it in or after the stripping step. We have found that molybdenum is removed completely from the extractant, along with uranium, when the extractant is contacted with an aqueous basic solution or slurry. We have further found that molybdenum remains in the extractant when uranium is removed by contacting the extractant with an aqueous solution of chloride ion. Thus after extracting uranium and molybdenum together it is possible either (1) to remove both uranium and molybdenum simultaneously

TABLE VII

*Extraction of metal values from sulfate solution*

[1 molar sulfate; pH~1, except as noted; metal value initially at ~2 g./liter, except as noted; diluent, Amsco D-95,[i] except as noted.]

| Metal | Extraction Coefficients, $E_a^0$, with— | | | | |
|---|---|---|---|---|---|
| | Primary | Secondary | | Tertiary | |
| | [j] | [k] | [l] | [m] | [n] |
| Mg(II) | 0.006 | 0.002 | <0.001 | 0.005 | <0.001 |
| Ca(II) | [d] 0.03 | [d] 0.004 | [d] 0.01 | [d] 0.015 | [d] 0.015 |
| Al(III) | 0.04 | <0.001 | 0.001 | <0.001 | 0.002 |
| Cr(III) | 0.04 | <0.001 | 0.001 | 0.009 | <0.001 |
| Mn(II) | 0.015 | <0.001 | 0.001 | 0.002 | <0.001 |
| Co(II) | 0.006 | <0.001 | <0.001 | 0.003 | <0.001 |
| Ni(II) | 0.004 | <0.001 | <0.001 | 0.002 | <0.001 |
| Cu(II) | 0.01 | 0.001 | <0.001 | 0.003 | <0.001 |
| Zn(II) | 0.004 | 0.002 | <0.001 | 0.003 | <0.001 |
| Fe(II) | [a, c] 0.08 | 0.01 | 0.002 | 0.004 | 0.002 |
| Fe(III) | [a, c] 25 | 0.1 | 0.01 | 0.02 | 0.002 |
| Ti(IV) | [c] 12 | [d] 4 | [d] 0.2 | | [f] |
| Zr(IV) | [c] >200 | [e] 35 | | [c] 15 | [g] |
| Ce(IV) | [d] >50 | [d] 0.02 | [d] <0.02 | [d] 0.5 | [d] 0.4 |
| Y(III) | [b] 50 | [h] | | | |
| Mo(VI) | 140 | 200 | 370 | 370 | 120 |
| V(IV) | [e] <0.2 | [e] <0.1 | | | [e] <0.1 |
| V(V) | | [e] 0.6 | | [e] 0.3 | |
| V(V) at pH 2 | | [e] 30 | | [e] 25 | |

[a] Diluent was benzene instead of Amsco D-95.
[b] Diluent was kerosene instead of Amsco D-95.
[c] Metal value initially at ~0.2 g./liter.
[d] Metal value initially at ~0.5 g./liter.
[e] Metal value initially at ~1 g./liter.
[f] $E_a^0(Ti)<0.05$ with tri-n-octylamine in kerosene+5 v. percent capryl alcohol.
[g] $E_a^0(Zr)=90$ with tri-n-octylamine in benzene.
[h] $E_a^0(Y)<0.1$ with di-tridecyl"P"-amine in kerosene.
[i] Amsco D-95 is identified in Table V.
[j] 1-(3-ethylpentyl)-4-ethyloctylamine.
[k] Dilaurylamine.
[l] Bis-(di-isobutylmethyl)-amine.
[m] Methyldi-n-octylamine.
[n] Tri-n-decylamine.

into an aqueous basic solution such as a sodium carbonate solution, and then to separate them by known methods, or (2) to remove uranium only into an aqueous chloride solution and then to remove molybdenum into an aqueous basic solution.

The foregoing description and example are not intended to restrict our invention and it should be limited only as is indicated by the appended claims.

Having thus described our invention, we claim the following:

1. A process for the recovery of uranium values from an aqueous acidic solution containing said values which comprises contacting said solution with a mixture comprised of a substantially water-immiscible non-polar, inert organic diluent and a member selected from the group consisting of

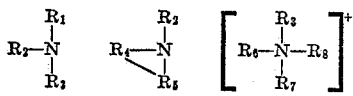

wherein $R_1$ and $R_2$ are selected from the group consisting of hydrogen, alkyl radicals, alkylene radicals, and alkyl radicals having at least one substituent selected from the group consisting of aryl, hydroxyl, amino, and alkoxyl, $R_3$, $R_6$, $R_7$, and $R_8$ are selected from the group consisting of alkyl radicals, alkylene radicals, and alkyl radicals having at least one substituent selected from the group consisting of aryl, hydroxyl, amino, and alkoxyl, and $R_4$—$R_5$ represents a polymethylene group, the total number of carbon atoms in said member being at least 10, whereby uranium values are extracted into the organic phase, separating the uranium-loaded organic phase from the remaining acidic solution, and removing extracted uranium values from said uranium-loaded organic phase.

2. The process of claim 1 wherein the aqueous acidic solution contains anions selected from the group consisting of sulfate, phosphate, acetate, chloride, nitrate, and fluoride.

3. The process of claim 1 wherein the aqueous acidic solution contains sulfate ion in a total anion concentration no greater than three molar.

4. The process of claim 1 wherein the aqueous acidic solution contains chloride ions in a concentration greater than four molar.

5. A process for the recovery of uranium values from a uranium-bearing ore which comprises leaching the uranium values from said ore with aqueous sulfuric acid, contacting the resulting leach liquor with a mixture of a substantially water-immiscible non-polar, inert organic diluent and a member selected from the group consisting of

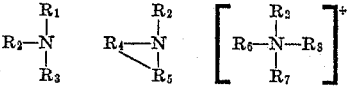

wherein $R_1$ and $R_2$ are selected from the group consisting of hydrogen, alkyl radicals, alkylene radicals, and alkyl radicals having at least one substituent selected from the group consisting of aryl, hydroxyl, amino, and alkoxyl, $R_3$, $R_6$, $R_7$, and $R_8$ are selected from the group consisting of alkyl radicals, alkylene radicals, and alkyl radicals having at least one substituent selected from the group consisting of aryl, hydroxyl, amino, and alkoxyl, and $R_4$—$R_5$ represents a polymethylene group, the total number of carbon atoms in said member being at least 10, whereby uranium values are extracted into the organic phase, separating the uranium-loaded organic phase from the resulting leach liquor, and removing extracted uranium values from said uranium-loaded organic phase.

6. A process for the recovery of uranium values from an aqueous acidic solution containing said values together with ions selected from the group consisting of chloride and nitrate ions, said ions being in a concentration greater than four molar, which comprises contacting said solution with a mixture comprised of a substantially water-immiscible non-polar, inert organic diluent and a member selected from the group consisting of

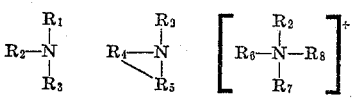

wherein $R_1$ and $R_2$ are selected from the group consisting of hydrogen, alkyl radicals, alkylene radicals, and alkyl radicals having at least one substituent selected from the group consisting of aryl, hydroxyl, amino, and alkoxyl, $R_3$, $R_6$, $R_7$, and $R_8$ are selected from the group consisting of alkyl radicals, alkylene radicals, and alkyl radicals having at least one substituent selected from the group consisting of aryl, hydroxyl, amino, and alkoxyl, and $R_4$—$R_5$ represents a polymethylene group, the total number of carbon atoms in said member being at least 10, whereby uranium values are extracted into the organic phase, separating the resulting uranium-loaded organic phase from the remaining acidic solution, contacting said uranium-loaded organic phase with water, whereby extracted uranium values are transferred to the aqueous phase, and separating the uranium-loaded aqueous phase from the remaining organic phase.

7. A process for the recovery of uranium values from an aqueous acidic solution containing said values together with ions selected from the group consisting of chloride and nitrate ions, said ions being in a concentration greater than four molar, which comprises contacting said solution with a mixture comprised of a substantially water-immiscible non-polar, inert organic diluent and a member selected from the group consisting of

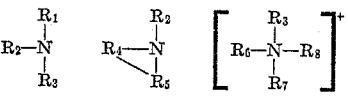

wherein $R_1$ and $R_2$ are selected from the group consisting of hydrogen, alkyl radicals, alkylene radicals, and alkyl radicals having at least one substituent selected from the group consisting of aryl, hydroxyl, amino, and alkoxyl, $R_3$, $R_6$, $R_7$, and $R_8$ are selected from the group consisting of alkyl radicals, alkylene radicals, and alkyl radicals having at least one substituent selected from the group consisting of aryl, hydroxyl, amino, and alkoxyl, and $R_4$—$R_5$ represents a polymethylene group, the total number of carbon atoms in said member being at least 10, whereby uranium values together with other ions are extracted into the organic phase, separating the resulting uranium-loaded organic phase from the remaining acidic solution, contacting said uranium-loaded organic phase with water, whereby extracted uranium values are transferred to the aqueous phase, and separating the uranium-loaded aqueous phase from the remaining organic phase and contacting said remaining organic phase with an aqueous phase containing at least one member selected from the group consisting of hydroxyl ions, carbonate ions, and calcium hydroxide whereby substantially all remaining ions are removed from said uranium-stripped organic phase.

8. A process for the recovery of uranium values from an aqueous acidic solution containing said values which comprises contacting said solution with a mixture comprised of a substantially water-immiscible non-polar, inert organic diluent and a member selected from the group consisting of

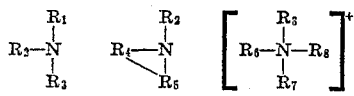

wherein $R_1$ and $R_2$ are selected from the group consisting of hydrogen, alkyl radicals, alkylene radicals, and alkyl radicals having at least one substituent selected from the group consisting of aryl, hydroxyl, amino, and alkoxyl, $R_3$, $R_6$, $R_7$ and $R_8$ are selected from the group consisting of alkyl radicals, alkylene radicals, and alkyl radicals having at least one substituent selected from the group consisting of aryl, hydroxyl, amino, and alkoxyl, and $R_4$—$R_5$ represents a polymethylene group, the total number of carbon atoms in said member being at least 10, whereby uranium values are extracted into the organic phase, separating the uranium-loaded organic phase from the remaining acidic solution, contacting said separated organic phase with an aqueous phase containing at least one member selected from the group consisting of chloride ions, nitrate ions, carbonate ions, hydroxyl ions, magnesium hydroxide, and magnesium oxide, whereby extracted uranium values are transferred to the aqueous phase, and recovering said transferred uranium values from the resulting uranium-loaded aqueous phase.

9. A process for the recovery of uranium values from an aqueous acidic solution containing said values which comprises contacting said solution with a mixture comprised of a substantially water-immiscible non-polar, inert organic diluent and a member selected from the group consisting of

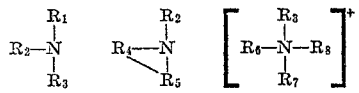

wherein $R_1$ and $R_2$ are selected from the group consisting of hydrogen, alkyl radicals, alkylene radicals, and alkyl radicals having at least one substituent selected from the group consisting of aryl, hydroxyl, amino, and alkoxyl, $R_3$, $R_6$, $R_7$ and $R_8$ are selected from the group consisting of alkyl radicals, alkylene radicals, and alkyl radicals having at least one substituent selected from the group consisting of aryl, hydroxyl, amino, and alkoxyl, and $R_4$—$R_5$ represents a polymethylene group, the total number of carbon atoms in said member being at least 10, whereby uranium values are extracted into the organic phase, separating the uranium-loaded organic phase from the remaining acidic solution, contacting said separated organic phase with an aqueous phase containing nitrate ions in a total anion concentration no greater than two molar whereby extracted uranium values are transferred to the aqueous phase, separating the resulting uranium-loaded aqueous phase from the remaining organic phase and contacting said remaining organic phase with an aqueous phase containing a member selected from the group consisting of hydroxyl ions, carbonate ions, and calcium hydroxide whereby substantially all remaining ions are removed from said remaining organic phase.

10. A process for the recovery of uranium values from an aqueous acidic solution containing said values together with contaminating ions which comprises contacting said solution with a mixture comprised of a substantially water-immiscible non-polar, inert organic diluent and a member selected from the group consisting of

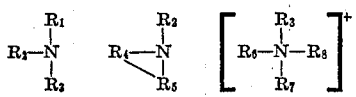

wherein $R_1$ and $R_2$ are selected from the group consisting of hydrogen, alkyl radicals, alkylene radicals, and alkyl radicals having at least one substituent selected from the group consisting of aryl, hydroxyl, amino, and alkoxyl, $R_3$, $R_6$, $R_7$, and $R_8$ are selected from the group consisting of alkyl radicals, alkylene radicals, and alkyl radicals having at least one substituent selected from the group consisting of aryl, hydroxyl, amino, and alkoxyl, and $R_4$—$R_5$ represents a polymethylene group, the total number of carbon atoms in said member being at least 10, whereby uranium values and a small proportion of contaminating ions are extracted into the organic phase, separating the uranium-loaded organic phase from the remaining acidic solution, contacting said separated organic phase with an aqueous phase containing chloride ions in a concentration greater than four molar, whereby ions extracted with the uranium values are transferred to the aqueous phase, separating the purified uranium-loaded organic phase from the resulting aqueous phase, and contacting said purified organic phase with water whereby uranium values are transferred to the aqueous phase and separating the resulting uranium-loaded aqueous phase from the remaining organic phase.

11. A process for the recovery of uranium values from an aqueous acidic solution containing said values together with contaminating ions which comprises contacting said solution with a mixture comprised of a substantially water-immiscible non-polar, inert organic diluent and a member selected from the group consisting of

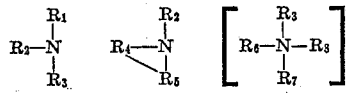

wherein $R_1$ and $R_2$ are selected from the group consisting of hydrogen, alkyl radicals, alkylene radicals, and alkyl radicals having at least one substituent selected from the group consisting of aryl, hydroxyl, amino, and alkoxyl, $R_3$, $R_6$, $R_7$ and $R_8$ are selected from the group consisting of alkyl radicals, alkylene radicals, and alkyl radicals having at least one substituent selected from the group consisting of aryl, hydroxyl, amino, and alkoxyl, and $R_4$—$R_5$ represents a polymethylene group, the total number of carbon atoms in said member being at least 10, whereby uranium values and a small proportion of contaminating ions are extracted into the organic phase, separating the uranium-loaded organic phase from the remaining acidic solution, contacting said separated organic phase with an aqueous phase containing chloride ions in a concentration greater than four molar, whereby extracted contaminant ions are transferred to the aqueous phase, separating the purified uranium-loaded organic phase from the resulting aqueous phase, contacting said purified organic phase with water whereby uranium values are transferred to the aqueous phase, separating the resulting uranium-loaded aqueous phase from the remaining uranium-depleted organic phase, and contacting said uranium-depleted organic phase with an aqueous phase containing hydroxyl ions.

12. A process for the recovery of uranium values from an aqueous acidic solution containing said values which comprises contacting said solution with a mixture comprised of a substantially water-immiscible non-polar, inert organic diluent and a member having the formula

wherein $R_1$ and $R_2$ are selected from the group consisting of hydrogen, alkyl radicals, alkylene radicals, and alkyl radicals having at least one substituent selected from the group consisting of aryl, hydroxyl, amino, and alkoxyl, and $R_3$ is selected from the group consisting of alkyl radicals, alkylene radicals, and alkyl radicals having at least one substituent selected from the group consisting of aryl, hydroxyl, amino, and alkoxyl, the total number of carbon atoms in said member being at least ten, whereby uranium values are extracted into the organic phase, separating the uranium-loaded organic phase from the remaining acidic solution, and removing extracted uranium values from said uranium-loaded organic phase.

13. The process of claim 12 wherein the organic diluent is selected from the group consisting of hydrocarbons, chlorinated hydrocarbons, ketones and nitro-hydrocarbons.

14. The process of claim 12 wherein the organic diluent is a hydrocarbon.

15. The process of claim 12 wherein the organic diluent is a petroleum hydrocarbon.

16. The process of claim 12 wherein the organic diluent is comprised of a petroleum hydrocarbon and an alcohol containing at least eight carbon atoms.

17. A process for the recovery of uranium values from a uranium-bearing ore which comprises leaching the uranium values from said ore with aqueous sulfuric acid, contacting the resulting leach liquor with a mixture comprised of kerosene, an alcohol containing at least eight carbon atoms and a member having the formula

wherein $R_1$ and $R_2$ are selected from the group consisting of hydrogen, alkyl radicals, alkylene radicals, and alkyl radicals having at least one substituent selected from the group consisting of aryl, hydroxyl, amino, and alkoxyl, and $R_3$ is selected from the group consisting of alkyl radicals, alkylene radicals, and alkyl radicals having at least one substituent selected from the group consisting of aryl, hydroxyl, amino and alkoxyl, the total number of carbon atoms in said member being at least 10, whereby leached uranium values are extracted into the organic phase, separating the resulting uranium-loaded organic phase from the remaining leach liquor, contacting the separated organic phase with an aqueous phase containing a member selected from the group consisting of chloride ions, nitrate ions, carbonate ions, hydroxyl ions, magnesium hydroxide and magnesium oxide, whereby extracted uranium values are transferred to the aqueous phase, and separating the uranium-loaded aqueous phase from the depleted organic phase.

References Cited in the file of this patent
UNITED STATES PATENTS 2,227,833    Hixson et al. _____ Jan. 7, 1941

OTHER REFERENCES

AEC Document BMI–JDS–146, October 10, 1948.
AEC Document AECD–4142, May 27, 1954.
AEC Document ORNL–1959, September 30, 1955.
AEC Document ORNL–2099, May 14, 1956.
AEC Document ORNL–2112, July 25, 1956.
AEC Document CF–56–7–95, July 17, 1956.
Research Report DOW–147, September 1, 1956.
Research Report DOW–149, November 1, 1956.

UNITED STATES PATENT OFFICE
Certificate of Correction

Patent No. 2,877,250                                   March 10, 1959

Keith B. Brown et al.

It is hereby certified that error appears in the printed specification of the above numbered patent requiring correction and that the said Letters Patent should read as corrected below.

Column 4, line 16, Table II, under the heading "TERTIARY AMINES", third column thereof, opposite "Tri-n-butylamine_____" for ">0.1" read —<0.1—; line 17, third column thereof, opposite "Tri-n-hexylamine_____" for "<100" read —>100—; line 23, second column thereof, opposite the syllable and leaders "lar_____" for ">0.1" read —<0.1—; line 33, third and fourth columns thereof, opposite "N-Lauryldimethylamine_____" for ">0.1", each occurrence, read —<0.1—; line 34, third column thereof, opposite "N-Lauryldiethylamine_____" for ">0.1" read —<0.1—; line 43, third and fourth columns thereof, opposite "SD$^c$ with 5 moles ethylene oxide)_____", for ">0.1", each occurrence, read —<0.1—; line 45, third column thereof, opposite "SD$^c$ with 50 moles of ethylene oxide)_____" for ">0.1" read —<0.1—; same Table II, line 48, under the heading "HETEROCYCLIC TERTIARY AMINES", third and fourth columns thereof, opposite "N-n-Decylpiperidine_____" for ">0.1", each occurrence, read —<0.1—; line 51, third and fourth columns thereof, opposite "conut oil)_____", for ">0.1", each occurrence, read —<0.1—; line 53, fourth column thereof, opposite "octadecenyl, derived from tallow)_____", for ">0.1" read —<0.1—; line 54, third column thereof, opposite "glyoxalidine_____", for ">0.1" read —<0.1—; same Table II, line 60, under the heading "QUATERNARY AMMONIUM COMPOUNDS", third column thereof, opposite "lauryl, derived from coconut oil)_____", for ">0.1" read —<0.1—; column 5, line 32, Table III, under the heading "NITRIC ACID", fifth column thereof, first item, for ">0.01" read —<0.01—; columns 5 and 6, Table IV, first column thereof, under the heading, "Amine (0.1 Molar)", line 2, for "trailkylmethylamine" read —trialkylmethylamine—; column 9, line 27, for "including a" read —including the—; line 60, first equation, at the end of the line, for "2SO$_4$-" read —2SO$_4$=—; line 61, second equation, at the end of the line, for "2SO$_4$-" read —2SO$_4$=—; line 64, third equation, at the end of the line, for $$2SO_4^- + \tfrac{3}{2} H_2O \quad \text{read} \quad 2SO_4^- + \tfrac{3}{2} H_2O$$

line 70, fourth equation, at the end of the line, for "2SO$_4$-" read —2SO$_4$=—; line 73, fifth equation, at the end of the line, for "2SO" read —2SO$_4$=—; column 10, line 43, for "as they" read —as the—; column 11, line 26, for "stirpping" read —stripping—; column 12, line 43, after "2.3 lbs." insert —of Na$_2$CO$_3$, 1.2 lb. of H$_2$SO$_4$, 0.25 lb. of NH$_3$, 0.025 lb.—; column 14, lines 13 to 16, claim 5, the extreme right-hand portion of the group should appear as shown below instead of as in the patent:

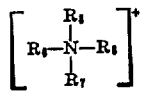

lines 39 to 42, claim 6, the extreme right-hand portion of the group should appear as shown below instead of as in the patent:

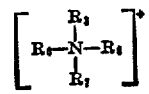

column 15, line 34, claim 8, for "B$_3$" read —R$_3$—.

Signed and sealed this 13th day of October 1959.

[SEAL]

Attest:
KARL H. AXLINE,
*Attesting Officer.*

ROBERT C. WATSON,
*Commissioner of Patents.*